United States Patent [19]

Gaddy

[11] 3,768,072

[45] Oct. 23, 1973

[54] REMOTE CONTROL CIRCUIT UTILIZING DIRECT CURRENT OF SELECTED MAGNITUDE AND POLARITY

[75] Inventor: Thomas W. Gaddy, Florence, S.C.

[73] Assignee: General Electric Company, Lynchburg, Va.

[22] Filed: Mar. 26, 1973

[21] Appl. No.: 344,574

[52] U.S. Cl. .......................... 340/147 PC, 340/172
[51] Int. Cl. .......................... H04q 1/00
[58] Field of Search .................. 340/147 PC, 167 P, 340/172, 167 R

[56] References Cited

UNITED STATES PATENTS

| | | | |
|---|---|---|---|
| 2,992,366 | 7/1961 | Veltfort, Jr. | 340/147 PC |
| 3,505,645 | 4/1970 | Quittner | 340/172 |

*Primary Examiner*—Donald J. Yusko
*Attorney*—James J. Williams et al.

[57] ABSTRACT

Direct current control of remote electrical apparatus is provided with a current polarity bridge that has a controlled rectifier connected between each adjacent pair of input and output terminals of the bridge. The bridge input terminals are connected through a current magnitude control circuit to a source of direct current, and the bridge output terminals are connected to a remote control line connected to the remote apparatus. The polarity of the direct current supplied to the remote control line is controlled by causing one pair of controlled rectifiers to conduct, and the magnitude of direct current supplied to the remote control line is controlled by selecting one of several resistance paths in the current magnitude control circuit.

6 Claims, 3 Drawing Figures

PATENTED OCT 23 1973

3,768,072

REMOTE CONTROL CIRCUIT UTILIZING DIRECT CURRENT OF SELECTED MAGNITUDE AND POLARITY

BACKGROUND OF THE INVENTION

My invention relates to a remote control circuit, and particularly to a remote control circuit that uses solid state devices to control the polarity and magnitude of direct current supplied to a remote control line.

Electrical apparatus, particularly radio transmitting and receiving equipment, must frequently be placed at some location which is remote from the location at which the apparatus is to be controlled. For example, it is desirable that a radio transmitter, receiver, and antenna be placed at a location, such as on a mountain top, which provides good communication. However it is also desirable that the operator or person utilizing the transmitter and receiver be at a convenient location remote from the mountain top, such as in an office building in a city. It is not only necessary that a communication line be provided between the operator location and the transmitter and receiver location, but it is also desirable that the remote radio equipment can be controlled from the operator location. In fact some control functions for remote radio equipment are required under the rules and regulations of the Federal Communications Commission. The communication and control functions can be provided over either a single telephone line or several telephone lines running between the operator location and the transmitter and receiver location. With respect to the control functions, certain line conditions and locations dictate that the control functions be provided by direct current. In order that the number of control lines be held to a minimum, different control functions are indicated by one of two polarities of direct current and by one of several magnitudes of direct current. With respect to the polarity, a selection is made from one of two conditions where one wire of the control line is positive and the other wire negative, or the one wire of the control line is negative and the other wire positive. This polarity selection permits two control functions to be indicated. Additional control functions can be indicated by changing the magnitude or level of the direct current on the control line. Thus, with two selectable polarities and, for example, three selectable current magnitudes, it is possible to indicate six control functions.

Previous circuits for providing polarity and current magnitude selections on a control line have utilized relays. Since the relays are mechanical devices, they are unreliable and subject to failure. In addition, the relays are relatively expensive, particularly the more reliable ones. Solid state circuits have been devised, but the circuits I am aware of have required both a positive and a negative current source. And, if battery standby operation is required, then two direct current to direct current converters are required for providing both polarity conditions.

Accordingly, a primary object of my invention is to provide an improved direct current remote control circuit that utilizes solid state devices.

Another and relatively specific object of my invention is to provide a direct current remote control circuit that can handle relatively high direct current voltages with solid state devices, that provides current polarity and current magnitude selection, and that permits the control line to be isolated from ground.

Another object of my invention is to provide a remote control circuit that permits the direct current supplied to a control line to have its polarity and magnitude selected from only a single source of direct current.

SUMMARY OF THE INVENTION

Briefly, these and other objects are achieved in accordance with my invention by a remote control circuit having positive and negative terminals that are to be connected to the single source of direct current voltage. A current polarity bridge having first and second input terminals and first and second output terminals is provided. The bridge includes four solid state or semiconductor controlled rectifiers. The first rectifier is connected to conduct current from the first input terminal to the first output terminal. The second rectifier is connected to conduct current from the first output terminal to the second input terminal. The third rectifier is connected to conduct current from the first input terminal to the second output terminal. And the fourth rectifier is connected to conduct current from the second output terminal to the second input terminal. A current magnitude control circuit utilizing resistors and transistors is provided. This circuit has an input terminal, an output terminal, and control terminals. The magnitude of current passed from the input terminal to the output terminal is determined by which control terminal receives a signal. The first and second output terminals of the bridge are connected to the remote control line. The positive source terminal is connected to the first input terminal of the bridge. And, finally, the second input terminal of the bridge is connected to the input terminal of the current magnitude control circuit, and the output terminal of the current magnitude control circuit is connected to the negative source terminal.

The polarity of the direct current applied to the remote control line is selected by causing one of the two opposite pairs of the controlled rectifiers to conduct current, and the magnitude of the direct current applied to the remote control line is determined by conduction of the selected transistor in the magnitude control circuit. Thus, I provide an improved direct current remote control circuit that utilizes solid state or semiconductor devices, that provides a relatively wide range of current magnitudes and two polarities to be selected, and that permits the control line to be isolated from ground.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

In the following description, I will first give a general description of my invention, utilizing the block diagram of FIG. 1. Then, I will give a more detailed description of my invention using the electrical circuit diagram of FIGS. 2*a* and 2*b*.

GENERAL DESCRIPTION

Figure 1:
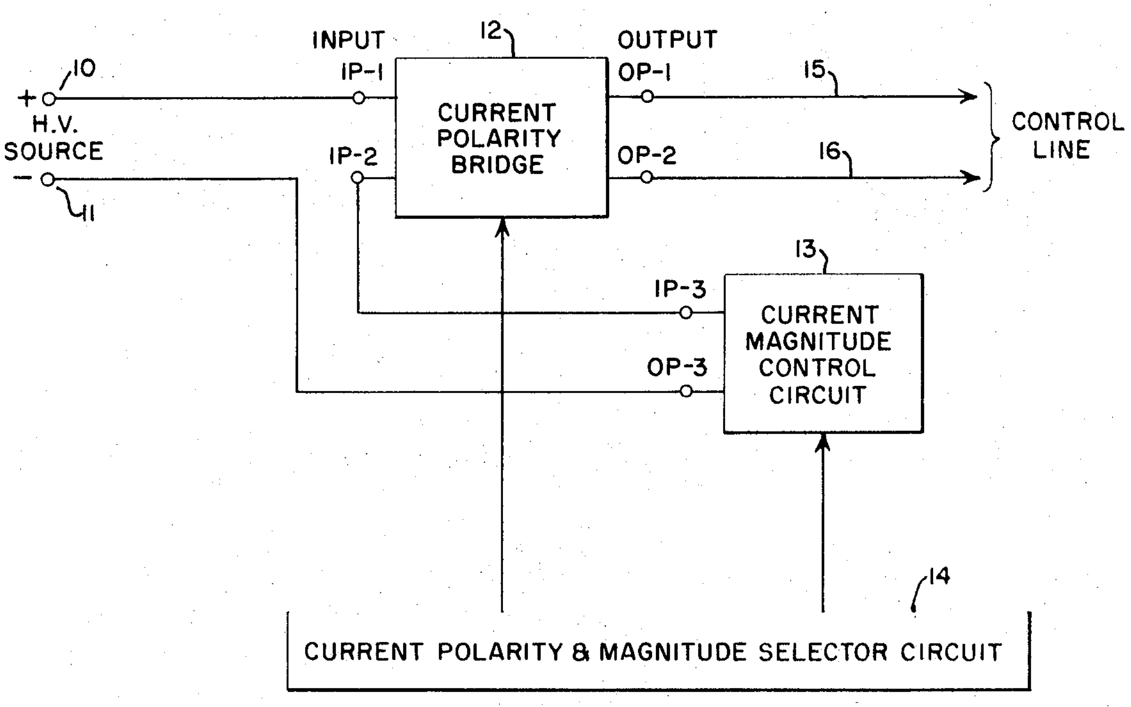
FIG. 1 shows a block diagram of an improved remote control circuit in accordance with my invention.

FIG. 1 shows a block diagram of my improved remote control circuit which is provided at the control location. A control line comprising two wires 15, 16 extends from the control location to the apparatus to be controlled at a remote location (not shown). Since direct current is used to provide the control functions, the line must have direct current continuity. Hence, it will be understood and appreciated that the responsive control circuit at the remote location must also provide direct current continuity in order that direct current can flow over the control line. If the control line also carries communication signals, the signals can be capacitively coupled to the line if inductors are inserted into the line to prevent the communication signals from being short-circuited. A relatively high voltage, direct current source is provided at positive and negative terminals 10, 11. This is the direct current to be supplied to the control line for controlling the apparatus at a remote location. The control equipment at the remote location is not part of my invention, but typically may use polarity and current sensing devices to provide a desired function in response to the respective polarity and current magnitude. In accordance with my invention, I provide a current polarity bridge 12 which has input terminals IP-1, IP-2 and output terminals OP-1, OP-2, and a current magnitude control circuit 13 having an input terminal IP-3 and an output terminal OP-3. I also provide a current polarity and magnitude selector circuit 14. This circuit 14 is connected to the current polarity bridge 12 to determine the relative polarities at the output terminals OP-1, OP-2, and a connection to the current magnitude control circuit 13 to determine the magnitude of current which flows from the input terminal IP-3 to the output terminal OP-3. The positive source terminal 10 is connected to the input terminal IP-1, and the output terminal OP-1 is connected to the wire 15 of the control line. The other output terminal OP-2 is connected to the wire 16 of the control line. The input terminal IP-2 is connected to the input terminal IP-3, and the output terminal OP-3 is connected to the negative source terminal 11. Depending upon the selection made by the current polarity and magnitude selector circuit 14, the polarity and current magnitude supplied to the control line can be controlled in accordance with my invention.

DETAILED DESCRIPTION

Figure 2A:
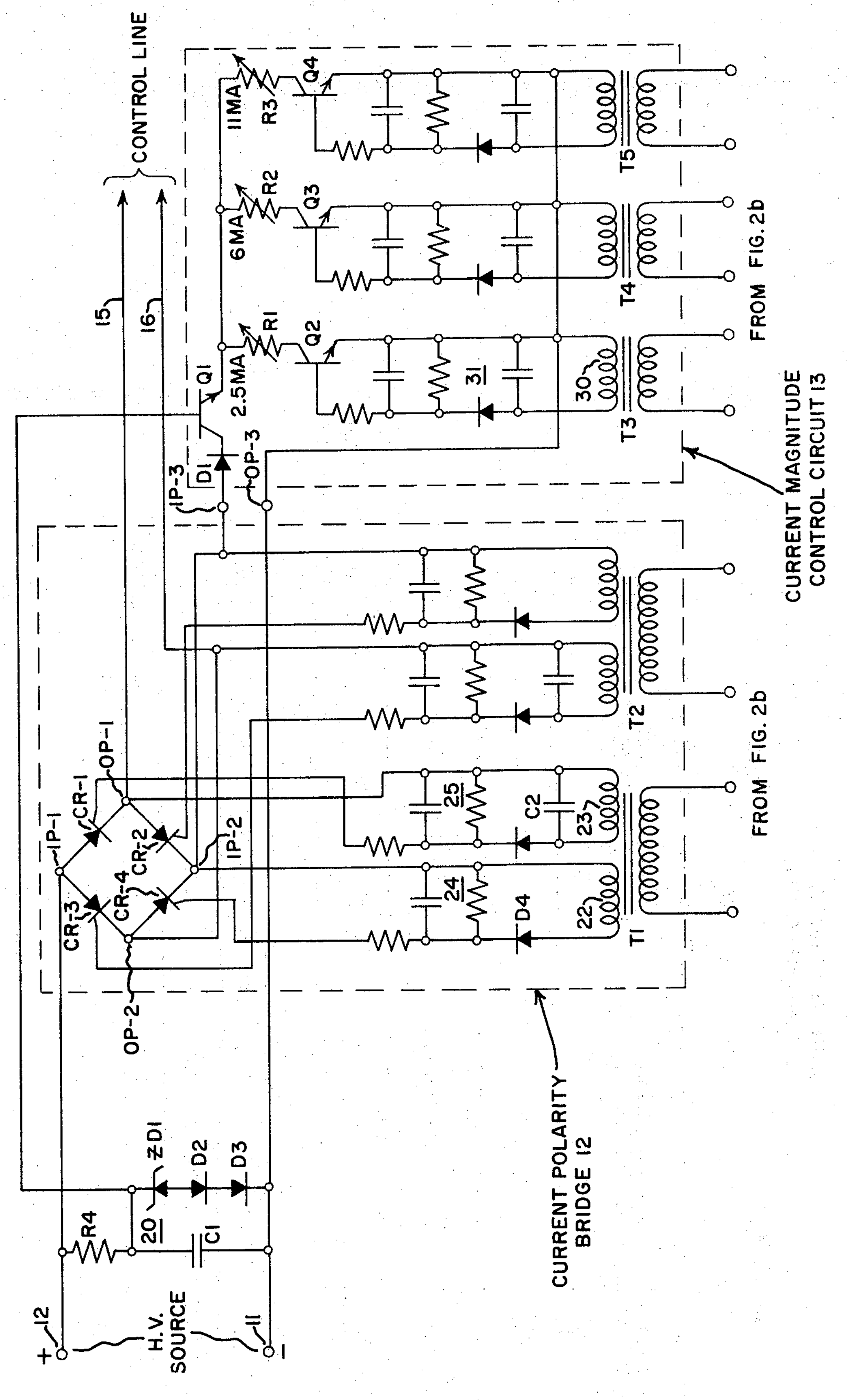
FIGS. 2*a* and 2*b* show an electrical circuit diagram of one embodiment of my remote control circuit of FIG. 1.
Figure 2B:
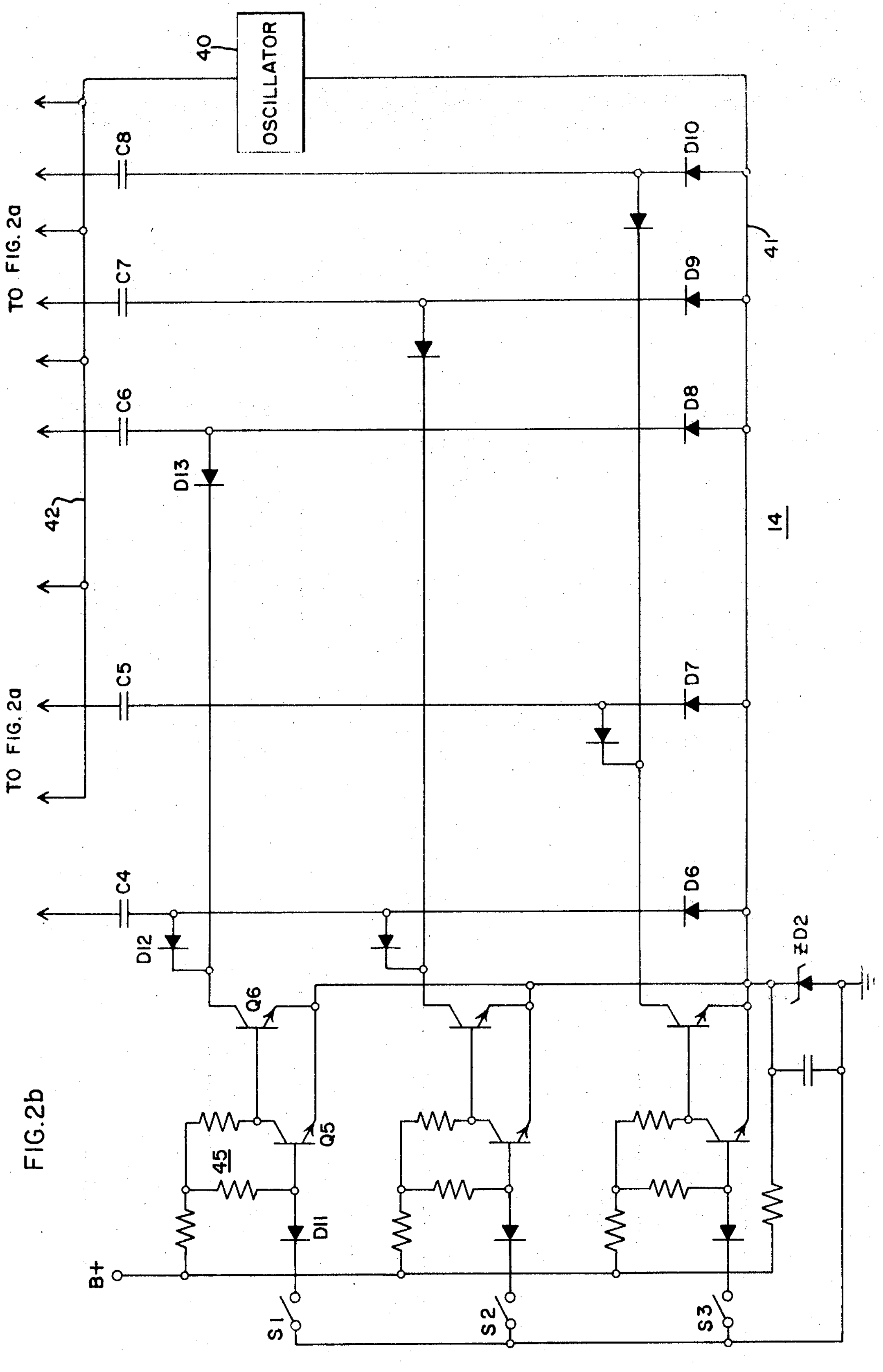

FIGS. 2*a* and 2*b* show detailed electrical circuit diagrams of the block diagrams shown in FIG. 1. FIGS. 2*a* and 2*b* are to be considered together, with the lines at the bottom of FIG. 2*a* being connected to the correspondingly positioned lines at the top of FIG. 2*b*. FIG. 2a shows the high voltage source terminals 10, 11, the current polarity bridge 12 enclosed in dashed lines, the wires 16,16 of the control line, and the current magnitude control circuit 13 also enclosed in dashed lines. FIG. 2*b* shows the current polarity and magnitude selector circuit 14.

In the current polarity bridge 12 in FIG. 2*a*, four semiconductors or solid state controlled rectifiers CR-1, CR-2, CR-3, CR-4 are provided. These controlled rectifiers may take a number of forms, but I prefer the known silicon controlled rectifiers. These silicon rectifiers comprise an anode, a cathode, and a control or gate electrode. With a positive voltage applied to the anode and a negative voltage applied to the cathode, the rectifier does not conduct current until a current gating pulse is applied to the control or gate electrode. This current pulse causes current to flow through the rectifier from the anode to the cathode. Current continues to flow even though the gating pulse is removed. Current flow through the rectifier can be stopped by removing the voltage across the anode and cathode. In the polarity bridge 12, the rectifier CR-1 is connected to conduct current from the input terminal IP-1 to the output terminal OP-1; the rectifier CR-2 is connected to conduct current from the output terminal OP-1 to the input terminal IP-2; the rectifier CR-3 is connected to conduct current from the input terminal IP-1 to the output terminal OP-2; and the rectifier CR-4 is connected to conduct current from the output terminal OP-2 to the input terminal IP-2. The input terminal IP-1 is connected to the positive source terminal 10, and the input terminal IP-2 is connected to the input terminal IP-3 of the current magnitude control circuit 13. The output terminals OP-1, OP-2 are connected to the wires 15, 16 of the control lines.

Within the current magnitude control circuit 13, a diode D1 has its anode connected to the input terminal IP-3. The cathode of the diode D1 is connected to the collector of an NPN type transistor Q1. The base electrode of the transistor Q1 is connected to a voltage reference circuit 20 which is connected across the source terminals 10, 11. This reference circuit 20 comprises a resistor R4, a zener diode rectifier ZD1 and two diode rectifiers D2, D3 connected in series between the terminals 10, 11. A capacitor C1 is preferably connected across the rectifiers ZD1, D2, D3. The voltage at the cathode of the zener diode ZD1 is a relatively stable, fixed voltage which is applied to the gate electrode of the transistor Q1 so that the collector-emitter current of the transistor Q1 remains stable or regulated at the magnitude selected by the control circuit. The emitter of the transistor Q1 is connected in common to one end of each of three variable resistors R1, R2, R3. The other ends of the resistors R1, R2, R3 are respectively connected to the collectors of NPN type transistors Q2, Q3, Q4. The emitters of these transistors Q2, Q3, Q4 are connected to the output terminal OP-3 of the current magnitude control circuit 13. This output terminal OP-3 is connected to the negative source terminal 11. As will be explained hereinafter, either the controlled rectifiers CR-1, CR-4 are rendered conductive or the controlled rectifiers CR-2, CR-3 are rendered conductive. If the rectifiers CR-1, CR-4 are rendered conductive, current flows from the positive source terminal 10 through the rectifier CR-1, over the wire 15 of the control line, through the responsive apparatus at the remote location and back over the wire 16, through the rectifier CR-4, through the diode D1 and the transistor Q1, through one of the control circuit paths designated 2.5 ma (milliamperes), 6 ma, or 11 ma, and back to the negative source terminal 11. However, if the rectifiers CR-2, CR-3 are rendered conductive, current flows from the positive source terminal 10 through the rectifier CR-3, over the wire 16, through the responsive apparatus of the remote location and back over the wire 15, through the rectifier CR-2, through the diode D1 and the transistor Q1, through one of the control circuit paths, and back to the negative source terminal 11. Thus, either polarity may be provided on the control line. That is, the wire 15 may be positive and the wire 16 may be negative, or the wire 16 may be positive and the wire 15 may be negative. The current magnitude is selected by causing one of the transistors Q2, Q3, Q4 to conduct current. The polarity selection and the current magnitude selection will now be described.

With respect to the current polarity selection, I provide two transformers T1, T2 in the current polarity bridge 12. The primary windings of these transformers are connected to the current polarity and magnitude selector circuit 14 of FIG. 2*b*. As will be explained, one of these two primary windings is provided with a pulsed signal to make the polarity selection. Each of the transformers T1, T2 has two secondary windings, designated 22, 23 for the transformer T1. One end of the secondary winding 22 is connected through a diode rectifier D4 to the gate electrode of the controlled rectifier CR-4, and the other end of the secondary winding 22 is connected to the cathode of the rectifier CR-4. A filter network 24 comprising resistors and a capacitor is also provided so as to filter the rectified voltage supplied by the diode rectifier D4. The secondary winding 23 is connected in a similar manner to the gate electrode and cathode of the controlled rectifier CR-1. In addition, a loading capacitor C2 is provided across the secondary winding 23 to reduce any transient or ringing effects that might be present in the transformer T1. When a pulsed or an alternating current signal is applied to the primary winding of the transformer T1, the signal is rectified and applied to the controlled rectifiers CR-1 and CR-4 to cause these rectifiers to conduct. A similar circuit arrangement is provided at the secondary windings of the transformer T2. This circuit is connected to the controlled rectifiers CR-2, CR-3. Thus, when a pulsed or an alternating current voltage is applied to the transformer T2, this causes the controlled rectifiers CR-2, CR-3 to conduct.

The current magnitude control circuit 13 comprises three transformers T3, T4, T5. The primary windings of the transformers T3, T4, T5 are connected to the current polarity and magnitude selector circuit 14 so that a selected one of the transformers is supplied with pulsed or alternating current. The secondary winding of each of the transformers T3, T4, T5 is connected to the gate and emitter of a respective one of the transistors Q2, Q3, Q4. More specifically, the secondary winding 30 of the transformer T3 is connected to a rectifier and filter circuit 31 so as to supply direct current to the base-emitter circuit of the transistor Q2 when alternating current is supplied to the primary winding of the transformer T3. The secondary windings of the transformers T4, T5 are connected through similar circuits to the base-emitter electrodes of their respective transistors Q3, Q4. When one of the transistors Q2, Q3, Q4 conducts, current flows from the emitter of the transistor Q1 through the respective one of the variable resistors R1, R2, R3, through the collector-emitter path of the one transistor, back to the negative source terminal 11. The magnitude or level of this current is determined by the magnitude of resistance in the particular one of the variable resistors R1, R2, R3 which is carrying current. As shown, I have arbitrarily selected current magnitudes of 2.5, 6, and 11 milliamperes (ma).

The current polarity and magnitude selector circuit 14 shown in FIG. 2b provides a source of pulsed or alternating current for selective application to one of the polarity bridge transformers T1, T2, and for selective application to one of the current magnitude control transformers T3, T4, T5. This alternating current is supplied by an oscillator 40 which produces any suitable alternating current signal, such as 250 kilohertz, for example. One side of the oscillator 40 output is applied to a bus 41 which is connected through respective diode rectifiers D6, D7, D8, D9, D10 and capacitors C4, C5, C6,C7, C8 to one end of the primary windings of the transformers T1, T2, T3, T4, T5. The other end of these primary windings is connected to a bus 42 to the other side of the oscillator 40 output. With this circuit as described thus far, no pulsed alternating current signal is applied to the primary windings because the oscillator 40 output is rectified by the diodes D6, D7, D8, D9, D10 to charge the capacitors C4, C5, C6, C7, C8. In order to apply an alternating current signal to the transformers T1, T2, T3, T4, T5, it is necessary to discharge selective ones of these capacitors C4, C5, C6, C7, C8, depending upon the current polarity and magnitude desired. With two current polarities and three current magnitudes being shown in FIG. 2*a*, there are, of course, six possible combinations which can be provided. However, I have shown only three selectable combinations in FIG. 2*b*, by way of example. Each of these combinations is selected by the closure of one of three selector switches S1, S2, S3. With respect to the selector switch S1, one terminal is connected to a point of reference potential or ground, and the other terminal is connected through a diode rectifier D11 to the base electrode of an NPN type transistor Q5. The selector circuit 14 has a source of direct current voltage B+ which is positive with respect to ground. This voltage B+ is supplied by a resistor network 45 to the transistor Q5 to keep the transistor Q5 in a normally conductive condition. The collector of the transistor Q5 is connected to the base electrode of an NPN type transistor Q6. The emitters of the transistors Q5, Q6 are connected together and connected through a zener diode rectifier ZD-2 to ground. The zener diode ZD-2 is provided as a voltage reference to insure that the transistor Q6, and corresponding transistors in the other function circuits, do not conduct erroneously to discharge one of the capacitors C4, C5, C6, C7, C8. With the transistor Q5 conducting, the transistor Q6 is turned off. The collector of the transistor Q6 is connected through a diode rectifier D12 to the capacitor C4 and through a diode rectifier D13 to the capacitor C6. The other switches S2, S3 have similar circuits.

With the oscillator 40 supplying alternating current voltage, assume that all of the capacitors C4, C5, C6, C7, C8 are charged. Then, assume that it is desired to cause the remote control function provided by the wire 15 being positive and the wire 16 being negative, and by a 2.5 milliampere current. This can be achieved by the function switch S1. When the switch S1 is closed, the transistor Q5 is turned off. This in turn causes the transistor Q6 to conduct current. Conduction of the transistor Q6 permits the charge on the capacitors C4, C6 to flow through the respective diode rectifiers D12, D13 through the transistor Q6 and the zener diode ZD-2 to ground. Thus, the charge on the capacitors C4, C6 is removed and alternating current is supplied from the oscillator 40 to the primary windings of the transformers T1, T3. With respect to the transformer T1, this supplies direct current to the gate electrodes of the controlled rectifiers CR-1, CR-4. With respect to the transformer T3, this supplies base current to the transistor Q2. Thus, the controlled rectifiers CR-1, CR-4 and the transistor Q2 conduct so that 2.5 milliamperes of current flow from the output terminal OP-1 through the wire 15 to the remote location, and back through the wire 16, the transistor Q1, and the transistor Q2 to the negative source terminal 11.

If another function is desired, the function switch S1 is opened, and another switch closed. When the function switch S1 is opened, this permits the capacitors C4, C6 to charge and remove voltage from the transformers T1, T3. Removal of the voltage at the transformer T1 does not cut off the controlled rectifiers CR-1, CR-4, but removal of the voltage on the transformer T3 does. This is because the transistor Q2 is turned off, thus opening the current flow path so that current stops flowing through the controlled rectifiers CR-1, CR-4. And since no gate electrode current is supplied to these controlled rectifiers CR-1, CR-4, they stop conduction. Then, another function switch is closed. If the function switch S3 is closed, for example, then alternating current voltage is supplied to the transformers T2, T5. This will cause the controlled rectifiers CR-2, CR-3 to conduct and the transistor Q4 to conduct. In this case, 11 milliamperes of current flow from the output terminal OP-2 through the wire 16 to the remote location, and back through the wire 15, through the transistor Q1, and the transistor Q4 to the negative source terminal 11.

It will thus be seen that I have provided a new and improved remote control circuit which, with the utilization of solid state or semiconductor devices, requires only one current source to provide two polarities of direct current to the wires of a remote control line (which can be ungrounded), and to provide selected current magnitudes. While I have shown only three current magnitudes, namely 2.5, 6, and 11 milliamperes, persons skilled in the art will appreciate that additional or other current magnitudes may be provided. The number of additional magnitudes is really limited only by circuit and line tolerances, and by the sensing tolerances of the remote control circuit. Other magnitudes are determined by the desired current magnitude response of the remote control equipment, and this may be easily met by adjustment of one of the resistors R1, R2, R3. While I have shown only one embodiment of my invention, it will be understood that other modifications may also be provided. For example, other types of function control circuits may be utilized to pulse the transformers T1, T2, T3, T4, T5, depending upon circuit design and preference. Similarly, other oscillator frequencies may be utilized. Or, other current polarity and magnitude selector circuits may be used in place of the transformers T1, T2, T3, T4, T5 to provide the desired isolation between the selector circuit 14 on one hand and the polarity bridge 12 and the magnitude control circuit 13 on the other hand. For example, light sensitive controlled rectifiers and transistors may be used in place of the components CR-1, CR-2, CR-3, CR-4, Q2, Q3, Q4. These light sensitive components may be activated or turned on by light emitting diodes which would replace the transformers T1, T2, T3, T4, T5 and their associated circuits. The various light emitting diodes could be turned on by a suitable voltage source connected to the function switches S1, S2, S3. Thus, light paths could provide the desired isolation. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved circuit for use at a first location to control apparatus at a second distant location over a communication line between the two locations, said improved circuit comprising:

a. positive and negative terminals for connection to a source of direct current voltage;

b. a current polarity bridge having:

1. first and second input terminals and first and second output terminals;

2. a first unidirectional current control device connected to conduct current from said first input terminal to said first output terminal, a second unidirectional current control device connected to conduct current from said first output terminal to said second input terminal, a third unidirectional current control device connected to conduct current from said first input terminal to said second output terminal, and a fourth unidirectional current control device connected to conduct current from said second output terminal to said second input terminal;

3. and means connected to said unidirectional current control devices to selectively cause said first and fourth control devices to conduct current, thereby providing one polarity condition at said polarity bridge output terminals, and to selectively cause said second and third unidirectional current control devices to conduct current, thereby providing an opposite polarity condition at said polarity bridge output terminals;

c. a current magnitude control circuit having an input terminal, an output terminal, and control terminals, said current magnitude control circuit including means for controlling the magnitude of current that flows between said input and said output terminals as a function of a current magnitude control signal applied to said control terminals;

d. means connecting said positive terminal to said first input terminal of said polarity bridge;

e. means connected to said first and second output terminals of said polarity bridge for connection to a control line;

f. and means connecting input terminal of said current magnitude control circuit to said second input terminal of said polarity bridge and said output terminal of said current magnitude control circuit to said negative terminal.

2. The improved circuit of claim 1, wherein said unidirectional current control devices comprise controlled rectifiers each having an anode, a cathode, and a control electrode.

3. The improved circuit of claim 1, wherein said current magnitude control circuit comprises a plurality of paths each having a variable resistor and a transistor connected in series, means connecting said paths in parallel between said input and said output terminals, and means connecting each of said transistors to a respective one of said control terminals.

4. The improved circuit of claim 3, wherein said current magnitude control circuit further comprises a common current regulator transistor connected in series with each of said paths.

5. The improved circuit of claim 4, wherein said unidirectional current control devices comprise controlled rectifiers each having an anode, a cathode, and a control electrode.

6. The improved circuit of claim 5, wherein said selective means connected to said control devices comprise transformers, wherein said means for controlling the magnitude of current comprise transformers connected to said current magnitude circuit transistors, and further comprising means connected to all of said transformers for selectively applying current to one of said polarity transformers and to one of said current magnitude transformers.

* * * * *

UNITED STATES PATENT OFFICE
CERTIFICATE OF CORRECTION

Patent No. 3,768,072 Dated October 23, 1973

Inventor(s) T. W. Gaddy

It is certified that error appears in the above-identified patent and that said Letters Patent are hereby corrected as shown below:

Column 3, line 62 cancel "16, 16" and insert -- 15, 16 --

Signed and sealed this 9th day of April 1974.

(SEAL)
Attest:

EDWARD M.FLETCHER,JR.
Attesting Officer

C. MARSHALL DANN
Commissioner of Patents